Patented Mar. 17, 1936

2,034,622

UNITED STATES PATENT OFFICE 2,034,622

PROCESS FOR THE MANUFACTURE OF INDIGOID DYESTUFFS

Eduard Kambli, Basel, and Ernst Stöcklin, Binningen, near Basel, Switzerland, assignors to the firm Society of Chemical Industry in Basle, Basel, Switzerland No Drawing. Application March 31, 1934, Serial No. 718,510. In Switzerland April 8, 1933

11 Claims. (Cl. 260—49)

This invention relates to the manufacture of indigoid dyestuffs by treating with an halogenating agent, in presence of an indifferent diluent, an isatin-α-halide of the general formula

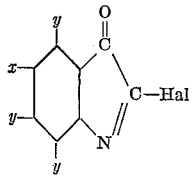

wherein $x$ is hydrogen and at least one $y$ is a monovalent substituent, and condensing the product with a reactive component suitable for the formation of indigoid dyestuffs.

Isatin-α-halides of the above general formula are, for instance, the α-chloride- or α-bromide of 4- or 6- or 7-methylisatin, of 4:6- or 4:7-dimethylisatin, of 4:6:7-trimethylisatin, of 4- or 6- or 7-methoxy- or ethoxyisatin, of 4-methoxy-7-halogenisatin, of 4:6- or 4:7-dimethoxy- or diethoxyisatin, of 4:6:7-trimethoxyisatin, of 4- or 6- or 7-alkylmercaptoisatin, of 4-methyl-6-ethoxy-7-ethoxyisatin and of 4:6-dimethyl-7-methoxyisatin.

For the treatment of the isatin-α-halide in presence of an indifferent diluent, such as benzene, chlorobenzene, nitrobenzene, tetrachlorethane or chloroform, there may be used as the halogenating agent, for example, chlorine or bromine or sulfuryl chloride in presence or absence of a halogen carrier, for instance iodine, antimony pentachloride or iron or an iron salt.

Following the halogenation of the isatin-α-halide, the condensation with the reactive component suitable for forming an indigoid dyestuff may be conducted according to any known method in presence of an indifferent diluent, such as benzene, chlorobenzene, nitrobenzene, tetrachlorethane or chloroform.

Reactive components suitable for the formation of indigoid dyestuffs are, for example, indoxyls and hydroxy-thionaphthenes of the benzene, naphthalene, anthracene and anthraquinone series; also phenols, naphthols, hydroxyanthracenes, hydroxyanthrones, hydroxycarbazoles, hydroxyacenaphthenes, hydroxyphenanthrenes, capable of being coupled; as well as, for example, the halogen-, alkyl-, alkoxy-, acylamino- and acyl-substitution products of these bodies.

The indigoid dyestuffs thus obtained may be used as such or treated with a halogenating agent, for instance chlorine, bromine or sulfuryl chloride in manner analogous to that described for halogenating isatin-α-halides.

A preferred form of the process consists in using as the parent material a mixture obtainable by the action of phosphorus halides, such as, for example phosphorus pentachloride or phosphorus pentabromide, in presence of an indifferent diluent on the isatin corresponding with the isatin-α-halide of the above general formula.

Particularly valuable is that modification of the process in which both the production of the isatin-α-halide or the treatment of this isatin-α-halide with a halogenating agent and the condensation with the reactive component suitable for forming indigoid dyestuffs, and also the treatment, if this be adopted, of the indigoid dyestuff obtained with a halogenating agent, are all conducted in the presence of the same indifferent diluent.

The indigoid dyestuffs obtainable in accordance with the invention can be converted by the usual processes into leuco-ester salts; they are suitable for dyeing and printing very various materials, for instance vegetable and animal fibres. The dyeings and prints obtained have very different tints and are very fast.

The following examples illustrate the invention, the parts being by weight:—

Example 1

A mixture of 17.5 parts of 4:7-dimethylisatin of the formula

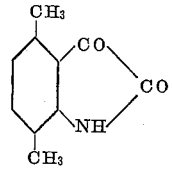

22 parts of phosphorus pentachloride and 400 parts of chlorobenzene is heated for 1 hour at 100–105° C., the 4:7-dimethylisatin-α-chloride of the formula

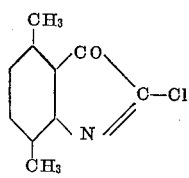

being formed. The mixture is cooled to 65–70° C. and, while stirring, 14 parts of sulfuryl chloride are introduced within half-an-hour. After about 1 hour the chlorination is complete. The whole is run into a solution of 17.9 parts of 4-chloro-α-naphthol of the formula

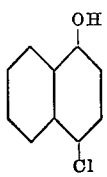

and 500 parts of chlorobenzene at 45–50° C. The mixture is stirred for ¼ hour at the said temperature, cooled and filtered, the solid matter being washed with chlorobenzene and dried.

The dyestuff of the formula

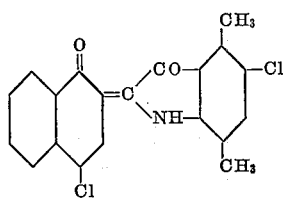

thus obtained agrees in its properties with the condensation product from 5-chloro-4:7-dimethylisatin-α-chloride and 4-chloro-α-naphthol.

*Example 2*

A mixture of 17.5 parts of 4:7-dimethylisatin, 22 parts of phosphorus pentachloride and 400 parts of chlorobenzene is heated for 1 hour at 100–125° C., 4:7-dimethylisatin-α-chloride being formed. The mixture is cooled to 0–5° C. and within half-an-hour 16 parts of bromine are added. The whole is then gradually warmed to 40° C. and kept at this temperature for some hours. The mixture thus obtained is filtered from some impurities and run into a solution of 22 parts of 4-bromo-α-naphthol of the formula

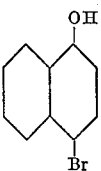

in 500 parts of chlorobenzene at 40–45° C. The whole is kept at this temperature for some minutes, cooled, filtered and the solid matter washed with chlorobenzene and dried.

The dyestuff of the formula

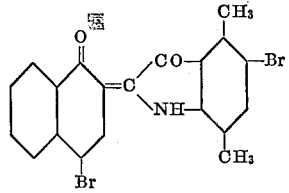

thus obtained dissolves in concentrated sulfuric acid to a dark green solution and dyes cotton in a yellowish-green vat pure blue tints. In cotton printing also blue tints of very good fastness are obtained.

*Example 3*

A mixture of 16.1 parts of 7-methylisatin of the formula

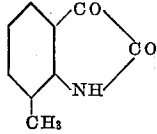

22 parts of phosphorus pentachloride and 400 parts of chlorobenzene is heated for 1 hour at 100–105° C., 7-methylisatin-α-chloride of the formula

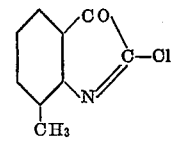

being formed. The mixture is allowed to cool to 65–70° C. and, while stirring, a solution of 14 parts of sulfuryl chloride in 20 parts of chlorobenzene and containing some antimony pentachloride is added. After stirring for about an hour at 65–70° C., the chlorination which occurs with lively evolution of sulfur dioxide is complete. The mixture thus obtained is allowed to flow into a solution of 20 parts of 4-methyl-6-chloro-hydroxythionaphthene of the formula

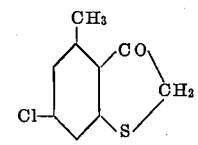

in 1000 parts of chlorobenzene at 60° C. The whole is stirred for 1 hour, allowed to cool to 40° C., and filtered; the solid matter, which is the desired dyestuff of the formula

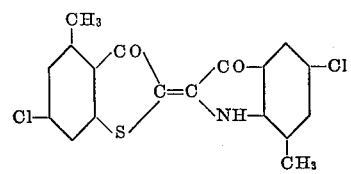

is washed with chlorobenzene and dried.

It is a brown-violet powder, soluble in concentrated sulfuric acid to a dark green solution; it dyes cotton in a yellow vat brownish-violet, fast tints. The dyeing properties of this dyestuff agree with those of the condensation product from 5-chloro-7-methylisatin-α-chloride and 4-methyl-6-chloro-hydroxythionaphthene.

*Example 4*

A mixture of 19.1 parts of 4-methyl-7-methoxyisatin of the formula

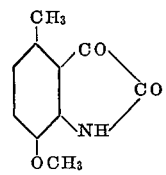

22 parts of phosphorus pentachloride and 600 parts of benzene is heated to 70–75° C., 4-methyl-7-methoxyisatin-α-chloride of the formula

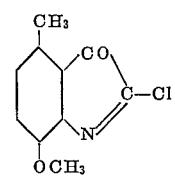

being formed. The mass is allowed to cool to 65–70° C. and, while stirring, 14 parts of sulfuryl chloride are added within a quarter of an hour. After stirring for about an hour at 65–70° C., the chlorination is complete. This mixture is run into a solution of 14.4 parts of α-naphthol of the formula

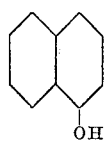

in 1000 parts of benezene of 45-50° C. and stirring is continued for about a quarter of an hour at this temperature. Then, in the course of half-an-hour, at 55-60° C., there are added 14 parts of sulfuryl chloride, diluted with 20 parts of benzene and the whole is stirred for about an hour at the said temperature. After cooling, the dyestuff of the formula

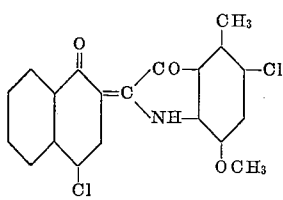

thus obtained is separated by filtration, washed with benzene and alcohol and dried.

It is a blue-violet powder, soluble in concentrated sulfuric acid to a dark green solution and dyeing cotton in an olive-yellow vat fast greenish-blue tints; in cotton printing the same tints are obtained. The dyeing properties of this dyestuff agree with those of the condensation product from 4-methyl-5-chloro-7-methoxyisatin-α-chloride and 4-chloro-α-naphthol.

*Example 5*

19.1 parts of 4-methyl-7-methoxyisatin are converted into 4-methyl-7-methoxyisatin-α-chloride in the manner described in Example 4 and are then chlorinated by the addition of 14 parts of sulfuryl chloride. The mixture is allowed to flow into a solution of 22 parts of 5:7-dichloro-3-hydroxythionaphthene of the formula

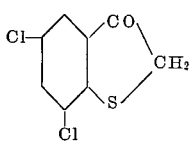

in 1000 parts of benzene at 60-65° C., while stirring is continued for about half-an-hour at this temperature. After cooling, the mass is filtered and the solid matter washed with benzene and alcohol and dried.

It constitutes the new dyestuff of the formula

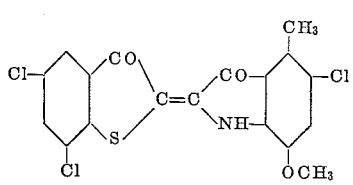

and is a blue powder, soluble in concentrated sulfuric acid to a green-blue solution and dyeing cotton in a yellow vat pure blue tints. In cotton printing the same tints are obtained. The dyeing properties of this dyestuff agree with those of the condensation product from 4-methyl-5-chloro-7-methoxyisatin-α-chloride and 5:7-dichloro-3-hydroxythionaphthene.

*Example 6*

A mixture of 22.5 parts of 4-ethoxy-7-chlorisatin of the formula

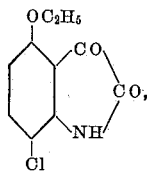

22 parts of phosphorus pentachloride and 400 parts of chlorobenzene is heated for 1 hour at 95-100° C., 4-methyl-7-chlorisatin-α-chloride of the formula

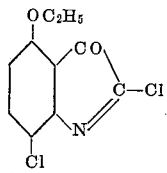

being thus obtained. The mass is allowed to cool to 55-60° C. and, after addition of 14 parts of sulfuryl chloride, is stirred at 63-68° C. for 2-3 hours, whereupon with evolution of sulfur dioxide the nucleal chlorination is complete. The mixture thus obtained is run into a solution of 20.0 parts of 2:1-naphthioindoxyl in 500 parts of chlorobenzene at 60-70° C., the whole is stirred for half-an-hour at this temperature, cooled, filtered and the solid matter washed with chlorobenzene and alcohol and dried.

The dyestuff of the formula

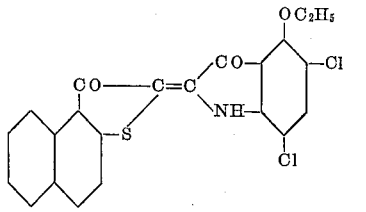

thus obtained is a dark-brown crystalline powder soluble in concentrated sulfuric acid to a blue solution and dyeing cotton in a yellow vat reddish-grey tints.

What we claim is:—

1. Process for the manufacture of indigoid dyestuffs, consisting in treating isatin-α-halides of the general formula

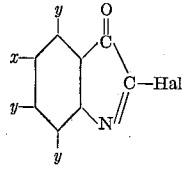

wherein $x$ is hydrogen and at least one $y$ is a member of the group consisting of halogen, alkoxy, alkylmercapto and alkyl of the lower aliphatic series, with halogenating agents in presence of indifferent diluents, and then condensing, without isolation, with reactive components to form the indigoid dyestuffs.

2. Process for the manufacture of indigoid dyestuffs, consisting in first treating reaction mixtures containing isatin-α-halides of the general formula

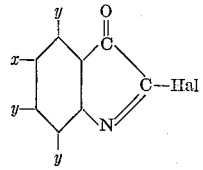

wherein x is hydrogen and at least one y is a member of the group consisting of halogen, alkoxy, alkylmercapto and alkyl of the lower aliphatic series, which mixtures are obtained by the action of phosphorus halides on the corresponding isatins, with halogenating agents in presence of indifferent diluents, and then condensing same, without isolation, with reactive components to form the indigoid dyestuffs.

3. Process for the manufacture of indigoid dyestuffs, consisting in first treating reaction mixtures containing isatin-α-halides of the general formula

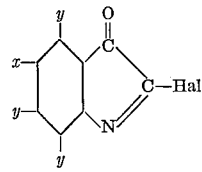

wherein x is hydrogen and at least one y is a member of the group consisting of halogen, alkoxy, alkylmercapto and alkyl of the lower aliphatic series, which mixtures are obtained by the action of phosphorus halides on the corresponding isatins, with halogenating agents in presence of indifferent diluents, and then condensing same, without isolation, with reactive components to form the indigoid dyestuffs, the several reaction stages being carried out in the presence of the same indifferent diluent.

4. Process for the manufacture of indigoid dyestuffs, consisting in first treating reaction mixtures containing isatin-α-chlorides of the general formula

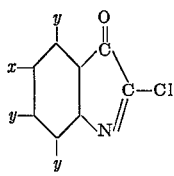

wherein x is hydrogen and at least one y is a member of the group consisting of halogen, alkoxy, alkylmercapto and alkyl of the lower aliphatic series, which mixtures are obtained by the action of phosphorus chlorides on the corresponding isatins, with halogenating agents in presence of indifferent diluents, and then condensing same, without isolation, with reactive components to form the indigoid dyestuffs, the several reaction stages being carried out in the presence of the same indifferent diluent.

5. Process for the manufacture of indigoid dyestuffs, consisting in first treating reaction mixtures containing isatin-α-chlorides of the general formula

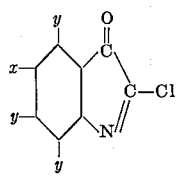

wherein x is hydrogen and at least one y is a member of the group consisting of halogen, alkoxy, alkylmercapto and alkyl of the lower aliphatic series, which mixtures are obtained by the action of phosphorus chlorides on the corresponding isatins, with halogenating agents in presence of indifferent diluents, then condensing same, without isolation, with reactive components to form the indigoid dyestuffs and allowing halogenating agents to react on the indigoid dyestuffs thus obtained, the several reaction stages being carried out in the presence of the same indifferent diluent.

6. Process for the manufacture of indigoid dyestuffs, consisting in first treating reaction mixtures containing isatin-α-chlorides of the general formula

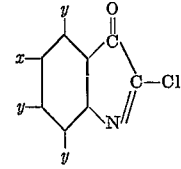

wherein x is hydrogen and at least one y is a member of the group consisting of halogen, alkoxy, alkylmercapto and alkyl of the lower aliphatic series, which mixtures are obtained by the action of phosphorus chlorides on the corresponding isatins, with chlorinating agents in presence of indifferent diluents, then condensing same, without isolation, with reactive components to form the indigoid dyestuffs and allowing halogenating agents to react on the indigoid dyestuffs thus obtained, the several reaction stages being carried out in the presence of the same indifferent diluent.

7. Process for the manufacture of indigoid dyestuffs, consisting in first treating reaction mixtures containing isatin-α-chlorides of the general formula

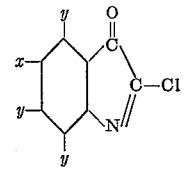

wherein x is hydrogen and at least one y is a member of the group consisting of halogen, alkoxy, alkylmercapto and alkyl of the lower aliphatic series, which mixtures are obtained by the action of phosphorus chlorides on the corresponding isatins, with sulfural chloride in presence of indifferent diluents, then condensing same, without isolation, with reactive components to form the indigoid dyestuffs and allowing halogenating agents to react on the indigoid dyestuffs thus obtained, the several reaction stages being carried out in the presence of the same indifferent diluent.

8. Process for the manufacture of indigold dyestuffs, consisting in first treating a reaction mixture containing 4-methyl-5-chloro-7-methoxyisatin-α-chloride of the formula

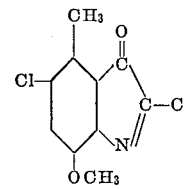

which mixture is obtained by the action of phosphorus chlorides on the corresponding isatin, with sulfuryl chloride in presence of indifferent diluents, then condensing the same, without isolation, with reactive components to form the indigoid dyestuffs and allowing halogenating agents to react on the indigoid dyestuffs thus obtained, the several reaction stages being carried out in the presence of the same indifferent diluent.

9. Process for the manufacture of indigoid dyestuffs, consisting in first treating a reaction mixture containing 4-methyl-5-chloro-7-methoxyisatin-α-chloride of the formula

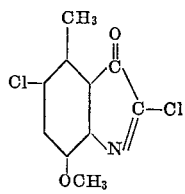

which mixture is obtained in presence of benzene by the action of phosphorus chlorides on the corresponding isatin, with sulfuryl chloride in presence of benzene, then condensing the same, without isolation, with reactive components suitable to form the indigoid dyestuffs and allowing halogenating agents to react on the indigoid dyestuffs thus obtained.

10. Process for the manufacture of indigoid dyestuffs, consisting in first treating a reaction mixture containing 4-methyl-5-chloro-7-methoxyisatin-α-chloride of the formula

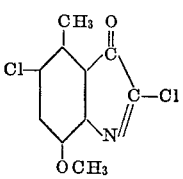

which mixture is obtained in presence of benzene by the action of phosphorus chlorides on the corresponding isatin, with sulfuryl chloride in presence of benzene, then condensing the same, without isolation, with reactive components to form the indigoid dyestuffs and allowing chlorinating agents to react on the indigoid dyestuffs thus obtained.

11. Process for the manufacture of an indigoid dyestuff, consisting in first treating a reaction mixture containing 4-methyl-5-chloro-7-methoxyisatin-α-chloride of the formula

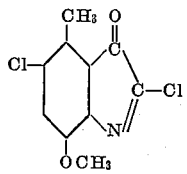

which mixture is obtained in presence of benzene by the action of phosphorus chlorides in the corresponding isatin, with sulfuryl chloride in presence of benzene, then condensing the same, without isolation, with α-naphthol and allowing sulfuryl chloride to react on the indigoid dyestuff thus obtained.

EDUARD KAMBLI.
ERNST STÖCKLIN.